L. HOFMEISTER.
AUTOMOBILE TIRE.
APPLICATION FILED AUG. 9, 1919.
1,336,139. Patented Apr. 6, 1920.
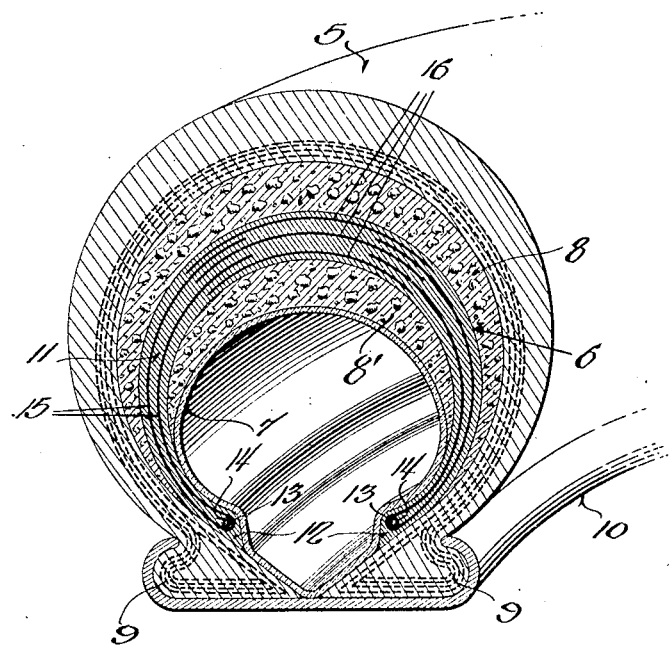
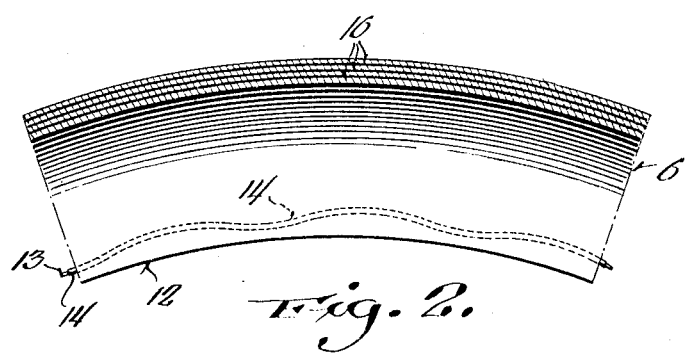

UNITED STATES PATENT OFFICE.

LEO HOFMEISTER, OF MILWAUKEE, WISCONSIN.

AUTOMOBILE-TIRE.

1,336,139.   Specification of Letters Patent.   Patented Apr. 6, 1920.

Application filed August 9, 1919. Serial No. 316,412.

*To all whom it may concern:*

Be it known that I, LEO HOFMEISTER, a citizen of the United States, and resident of Milwaukee, in the county of Milwaukee and State of Wisconsin, have invented new and useful Improvements in Automobile-Tires, of which the following is a description, reference being had to the accompanying drawings, which are a part of this specification.

The invention relates to pneumatic tires and has for its object to provide a puncture-proof construction and one in which the casing is relieved to a great extent of side strain.

The invention is further designed to provide an automobile tire having an outer casing, an inner casing of limited expansibility, a layer or intermediate mass of yielding material, such as sponge rubber composition of some depth interposed between said inner and outer casings, and a pneumatic inner tube which when inflated holds the inner casing against the yielding material adjacent the tread portion of the outer casing and thereby holds said outer casing in tension.

Another object of the invention is to provide kinked wires at the inner peripheral edges of the inner casing which will permit the inner rims or edges of the inner casing to expand and engage snugly against the adjacent side walls of the outer casing when subjected to pressure from the inner tube. Former structures of this character have proven unsuccessful in that pneumatic tire shoes often varied a small fraction of an inch in diameter and when the rim wires of the inner casing are substantially rigid or non-expansible, a poor fit is had.

In the usual pneumatic tire construction the outer casing resists or limits the outward expansion of the inner tube. In the present invention the inner casing of limited expansibility limits the outward expansion of the inner tube and the outer casing is simply a tread member which will readily yield in all directions under strain in a manner similar to the outer casing of the usual pneumatic tire constructions.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing I have illustrated one complete example of the physical embodiment of my invention constructed according to the best mode I have so far devised for the practical application of the principles thereof, and in which:

Figure 1 is a cross sectional perspective view of a portion of a tire embodying my invention, and Fig. 2 is a longitudinal sectional view through a portion of the inner casing, the outer and inner layers, of sponge rubber or other yielding material, being removed.

In general the tire consists of an outer casing 5, an inner casing 6, an inner tube within the casing 6, an intermediate layer of sponge rubber or other yielding material 8 disposed between the outer casing 5 and inner casing 6, and an intermediate layer of sponge rubber or other yielding material 8' disposed between the inner casing 6 and the inner tube 7, the layers 8 and 8' forming substantially a part of the casing 6.

The outer casing 5 may be of any desired construction and is preferably of the type readily removable from the rim, the drawings showing said casing provided with circumferential beads 9 which are hooked under or held by the curved flanges of the rim 10 so that when the tire is inflated the outer casing will be firmly in place upon the rim and on deflation readily removed from said rim.

The inner casing 6 is made up of fabric portions and rubber 11 vulcanized together to form a casing of limited expansibility, said casing being of a diameter substantially the same as that of the inner periphery of the outer casing so that the inner casing may be disposed therein and held thereagainst by the pressure exerted thereupon by the usual inner tube 7. This inner casing 6 at its inner edges 12 has circumferentially extending wires 13 surrounded by a rubber tube 14 embedded in said edges, and layers 15 of friction cloth in its sides, which friction cloth has no appreciable expansibility transversely of the casing, and layers 16 of breaker cloth cut on the bias to provide for limited expansibility transversely of said casing, the cloth layers overlapping each other and being impregnated with rubber and vulcanized in the usual manner to form a homogeneous structure, as more clearly described and illustrated in Patent No. 1,279,694 issued to me September 24, 1918. With this construction of casing the inner edges 12 are held in place within the outer casing by the wires 13 and the layers 15 at the upper portion of said casing permit of limited expansibility.

The intermediate layers 8 and 8' of sponge rubber or other yielding material are preferably vulcanized to the inner and outer surfaces of the casing 6 and extend to a point spaced a slight distance from the peripheral edges thereof, as best shown in Fig. 1.

The outer surface of the layer 8 is curved or shaped to conform to the curve of the casing 5 so that when the inner tube 7 is inflated the same will be held firmly thereagainst and whereby the entire inner casing 6 will press outwardly and exert a pressure against the outer casing 5 to hold it in tension and maintain it on the rim.

In view of the spongy composition 8 beneath the tread of the outer casing and the inner casing, it will be very difficult for any sharp elements such as nails or tacks to pierce the inner tube 7. Also since the inner casing sustains the pressure of the inner tube and limits its expansibility, the outer tube is relieved of side strains and thus side blow outs are prevented. Furthermore, the outer casing becomes simply a tread member the parts of which are in tension in the direction of the rim and the extending of the layers 8 and 8' along the sides of the inner casing prevents puncture of the inner tube from the sides of the outer tube, and at the same time allows the inner casing to be compressed laterally under heavy pressure without injury to it or the outer shoe 5.

It will also be noted that when the tire is inflated and meets with an obstruction tending to flatten the tread, that the outer casing will be free to stretch laterally because of the local compressibility of the sponge rubber and under ordinary shocks the inner casing and tube will be little affected if at all because of the deadening or absorption of these shocks by the intermediate composition 8 and 8'.

The wire 13 in my Patent No. 1,279,694, above referred to, is extended annularly around the edges 12 of the casing 6 on an even curve or arch, whereas, in the present structure, the same is kinked or waved to permit its straightening should the casing 5 be of a slightly greater diameter than the casing 6 and thus permit its use without leaving a space between the casings 5 and 6 at any point.

What I claim as my invention is:

1. An inner casing for a pneumatic tire of the class described having resilient means reinforcing the inner peripheral edges thereof, said resilient means being expansible whereby the inner peripheral edges of said casing are adapted to have snug engagement with the adjacent side wall portions of an outer casing usually employed in connection therewith.

2. A pneumatic tire of the class described comprising an outer casing, an inner casing disposed therein, an inner tube disposed in the inner casing, and intermediate layers of readily yielding material disposed between said inner casing and outer casing and said inner casing and inner tube.

3. A pneumatic tire of the class described comprising an outer casing, an inner casing disposed therein, an inner tube disposed in the inner casing, and layers of sponge rubber disposed between said outer casing and inner casing and said inner casing and said inner tube, said layers of sponge rubber being vulcanized to said inner casing whereby to form homogeneous structure therewith.

4. A pneumatic tire of the class described comprising an outer casing, an inner casing disposed therein, a wire formed in the inner peripheral edges of the inner casing and having a plurality of waves therein whereby the inner edges of said inner casing may conform to the curves of said outer casing, and an inner tube disposed in the inner casing and adapted to be inflated to hold said inner casing under pressure and thereby hold the outer casing in tension.

5. A pneumatic tire of the class described comprising an outer casing, an inner casing including an inner and outer layer of sponge rubber, said outer layer of sponge rubber being shaped to conform with the curvatures of said outer casing, means permitting the ready expansibility of the inner peripheral edges of said inner casing, and an inner tube disposed in the inner casing and bearing against the inner layer of sponge rubber and adapted to be inflated to hold said inner casing under pressure and thereby hold the outer casing in tension.

6. An inner casing for a pneumatic tire of the class described including a plurality of alternate layers of fabric and rubber vulcanized together and an inner and outer layer of sponge rubber, said outer layer of sponge rubber being shaped to conform with the curvatures of an outer pneumatic casing, and reinforcing means for the inner peripheral edges of said inner casing consisting of resilient reinforcing cables provided with waves, said inner layer of sponge rubber being adapted to be engaged by an inner tube disposed within the inner casing.

In testimony whereof, I affix my signature.

LEO HOFMEISTER.